United States Patent [19]

Takeda et al.

[11] Patent Number: 5,077,716
[45] Date of Patent: Dec. 31, 1991

[54] OPTICAL RECORDING AND REPRODUCING SYSTEM HAVING AN ACCURATE HIGH-SPEED OPTICAL HEAD POSITIONING APPARATUS

[75] Inventors: Katsumi Takeda, Yokohama; Tadashi Saitoh, Fujisawa; Masashi Mori, Chigasaki; Toshihiro Matsunaga, Kamakura, all of Japan

[73] Assignees: Hitachi, Ltd, Tokyo; Hitachi Video Eng. Inc., Kanagawa, both of Japan

[21] Appl. No.: 390,398

[22] Filed: Aug. 7, 1989

[30] Foreign Application Priority Data

Sep. 16, 1988 [JP] Japan .................... 63-230021

[51] Int. Cl.⁵ .................................................... G11B 7/00
[52] U.S. Cl. .................................. 369/32; 369/124; 369/44.34; 369/33; 360/77.02; 360/78.05
[58] Field of Search ............ 369/32, 43, 52, 54, 369/58, 106, 124, 44.29, 44.35, 47, 44.34, 44.26, 44.27, 44.31; 360/78.06, 78.05, 77.02; 250/201.5

[56] References Cited

U.S. PATENT DOCUMENTS

| | | | |
|---|---|---|---|
| 4,481,613 | 11/1984 | Yokota | 360/78.06 |
| 4,562,562 | 12/1985 | Moriya et al. | 369/44.29 |
| 4,607,956 | 8/1986 | Ishihara et al. | 369/32 |
| 4,710,908 | 12/1987 | Ohshima et al. | 369/32 |
| 4,745,587 | 5/1988 | Maeda et al. | 369/32 |
| 4,745,588 | 5/1988 | Yoshikawa et al. | 369/32 |
| 4,866,687 | 9/1989 | Kasai et al. | 369/43 |

FOREIGN PATENT DOCUMENTS 0207439 11/1984 Japan .
0289929 12/1987 Japan .

*Primary Examiner*—Roy N. Envall, Jr.
*Assistant Examiner*—Thang V. Tran
*Attorney, Agent, or Firm*—Antonelli, Terry Stout & Kraus

[57] ABSTRACT

An optical recording and reproducing system having an accurate high-speed optical head positioning apparatus. In one embodiment, a positive acceleration is applied to the optical head until the optical head has moved half the distance to a target track. Thereafter, a negative acceleration is applied to the optical head to decelerate the optical head until the optical head arrives at the target track. Feedback control is not used while the optical head is moving, thus eliminating a delay in response time due to a limited servo band upon the transition from the positive acceleration to the negative acceleration.

9 Claims, 14 Drawing Sheets

OPTICAL RECORDING AND REPRODUCING SYSTEM HAVING AN ACCURATE HIGH-SPEED OPTICAL HEAD POSITIONING APPARATUS

BACKGROUND OF THE INVENTION

The present invention relates to an optical recording and reproducing system for optically recording an information signal in a disk and optically reproducing the information signal from the disk, and more particularly to an access control circuit for such an optical recording and reproducing system suitable for high-speed access.

As the conventional optical recording and reproducing system is known one which is described by JP-A-59-207439 and has a construction shown in FIG. 11. This first prior art will now be explained.

A stroke signal 225 supplied from an external control circuit (not shown) is preset into a counter 217. The stroke signal 225 indicates the movement stroke of an optical head 201. An output signal of the counter 217 is supplied to a reference velocity generating circuit 222 and a control circuit 223. The control circuit 223 is supplied with a head position signal 230 from a head position detector 213 in addition to the output signal of the counter 217. During a period of time from the instant of time when the output signal of the counter 217 is zero and the head position signal 230 becomes zero until a predetermined time lapses (i.e. during a period of time from the arrival of the optical head to a target or desired position until the lapse of the predetermined time), the control circuit 223 supplies, to a second switch 228 and a third switch 238, signals for connecting these switches to their terminal A sides shown in FIG. 11. When the second switch 228 is connected to the A side, a lens position signal 226 detected by a lens position detector 206 and indicative of the position (in a tracking direction indicated by arrow 231) of a lens movable part 208 for an optical base 205 in the optical head 201 is fed back to a lens actuator 207 through a second filter circuit 227, the second switch 228 and a second power amplifier 229. As a result, the lens movable part 208 is located into a position at which the lens position signal 226 is zero. On the other hand, the third switch 238 connects an output signal of the first switch 220 to a first amplifier 221. At this time, a position of the lens movable part 208 in a focus direction is detected by a focus error detector 203. The detected focus error signal 214 is fed back to a focus actuator 204 through a focus control circuit 202. Thereby, a focus control is made so that a recording surface of a disk 210 is always in a focal position of an objective lens. The disk 210 is rotated by an output shaft 601 of a motor 600 which in turn is driven by a drive circuit (not shown).

Until the head position signal 230 becomes smaller than a predetermined value with the output signal of the counter 217 being zero (i.e. until the optical head 201 reaches a position which is in front of the target position by a predetermined distance therefrom), the control circuit 223 outputs to the first switch 220 a signal for connecting the switch to its terminal B side. Thus, a reference velocity signal generated from the reference velocity signal generating circuit 222 in accordance with the output signal of the counter 217 is supplied to a first power amplifier 221 through a differential amplifier circuit 219 and the first switch 220. A head actuator 212 is driven in accordance with the reference velocity signal. When the head actuator 212 is thus driven, the optical head 201 mechanically connected to the head actuator 212 by a shaft 612 is similarly driven toward the target position. The movement of the optical head 201 at this time is detected by the head position detector 213 which in turn supplies the head position signal 230 to a velocity detector 218. The velocity detector 218 detects the velocity of the optical head 201 from the head position signal 230. The detected head velocity signal is fed back to the differential amplifier circuit 219. In this manner, a velocity control is made so that the velocity of the optical head 201 follows a velocity indicated by the reference velocity signal.

The head position signal 230 is also supplied to a direction pulse generating circuit 215 which in turn generates a direction pulse corresponding to the direction of movement of the optical head 201 each time the optical head 201 moves over a predetermined distance. This direction pulse is fed back to the counter 217 which in turn makes a subtraction for the preset stroke signal. The reference velocity signal generated by the reference velocity signal generating circuit 222 supplied with the output signal of the counter 217 becomes small as the optical head 201 gets near the target position. Thus, a velocity control for the optical head 201 is made in such a manner that the optical head is first accelerated with a large acceleration and thereafter follows the reference velocity when the velocity of the head reaches the reference velocity. Generally, the deceleration of the reference velocity until the target position is established to a large value nearly equal to the value of acceleration in order to realize high-speed track access. The lens movable part 208 including the objective lens is located in a position at which the output signal 226 of the lens position detector 206 is zero. Therefore, the lens movable part 208 is not almost moved even for the large acceleration and deceleration of the optical head 201 by the velocity control. Accordingly, a positional error of the objective lens is suppressed to a very small value.

When the optical 201 reaches the position in front of the target position distanced by the predetermined distance under the above-mentioned velocity control, the control circuit 223 outputs to the first switch 220 a signal for connecting the switch to its terminal A side. Thereby, the head position signal 230 detected by the head position detector 213 indicative of the position of the optical head 201 is supplied to the first power amplifier 221 through a first filter circuit 216 for phase compensation and the first switch 220. On the basis of the head position signal 230, the head actuator 212 is driven to make a position control for the optical head 201 so that the head position signal 230 becomes zero. As a result, the optical head 201 is located into the target position. At this time, the lens movable part 208 including the objective lens is located into a position at which the output signal 226 of the lens position detector 206 is zero, like the case of the velocity control for the optical head. Therefore, even if the optical head 201 is located into the target position by a large deceleration, a positional deviation of the lens movable part 208 is not almost produced. A (decreasing) vibration of the lens movable part 208 caused by a positional deviation after the optical head 201 has been located is not generated and hence the access time can be shortened. Further, it is possible to eliminate any bad influence on the optical system resulting from a large positional deviation of the objective lens in the optical head 201.

After the optical head 201 has been thus located into the target position, the control circuit 223 outputs, to the second switch 228 and the third switch 238, signals for connecting these switches to their terminal B sides. As for the second switch 228, a tracking position error signal 232 detected by a tracking position detector 234 and indicating a positional error of a beam spot 209 for a track is supplied to the second power amplifier 229 through a third filter circuit 233 for phase compensation, a lens access control circuit 235 and the second switch 228. The power amplifier 229 drives the lens actuator 207 on the basis of the tracking position error signal 232. As a result, the lens movable part 208 is located so that the light spot 209 is positioned onto the nearest track (not shown).

As for the third switch 238, the lens position signal 226 detected by the lens position detector 206 is supplied to the first power amplifier 221 through a fourth filter circuit 237 for phase compensation to control the optical head 201 through the head actuator 212 so that the optical head 201 is located into a position at which the lens position signal 226 is zero. In this manner, while the light spot 209 is correctly located on a track, the optical head 201 is located into the position at which the lens position signal is zero (that is, the lens movable part 208 is located into a center position in a movable range for tracking control). Thereby, the optical head 201 can follow any variation of the track position at a relatively low frequency caused by the eccentricity of the disk 210 and it becomes possible to always locate the lens movable part 208 in the center position into the movable range for tracking control. Accordingly, the accuracy of location or positioning of the optical head 209 into the track position can be greatly improved since the lens movable part 208 is not influenced by a supporting spring (not shown) even if the eccentricity if the disk 210 is large.

If the light spot 209 is thus located into the nearest track, the address of the track on which the light spot 209 is positioned is read by an information reproducing circuit (not shown). In general, a possibility that the light spot 209 may be located into the target track through only one movement of the optical head 201 is little. Therefore, the light spot 209 is moved over the number of tracks corresponding to a difference between the address of the target track and the address of a track on which the light spot 209 is positioned at present. This movement of the light spot 209 is carried out through the repetition of a track jump which usually causes movement over one track. The track jump is made as follows. Namely, a track jump instruction (signal) 236 is externally supplied to the lens access control circuit 235. On the basis of the track jump instruction 236, the lens access control circuit 235 effects the track jump of the light spot 209 through the second switch 228, the second power amplifier 229 and the lens actuator 207 so that the lens movable part 208 is moved over one track or the light spot 209 is located into the next or adjacent track.

Though the output signals of the head position detector 213, the lens position detector 206 and the tracking position detector 234 are amplified by respective amplifiers, the illustration and explanation thereof are omitted from FIG. 11 and the above description.

As a second prior art is known an optical recording and reproducing system which is described by JP-A-62-289929 and has a construction shown in FIG. 12.

In FIG. 12, reference numeral 1 designates a disk, numeral 2 an optical head, numeral 3 a linear motor, numeral 4 a light emitting element, numeral 5 an optical position detector, numeral 6 a moving part driving circuit, numeral 31 a detecting circuit, numeral 32 a subtracting circuit, numeral 34 a digital-to-analog (D/A) converting circuit, numeral 35 an operating circuit, and numeral 36 a memory. In this second prior art, the overall detection range of the optical position detector 5 is bisected, thereby improving the linearlity of an output signal of the detector.

First, in order to move the optical head 2 to a track (not shown) in the inner circumferential portion of a recording area of the disk 1, a sensor position signal 61' corresponding to the inner circumferential position is supplied from the operating circuit 35 to the subtracting circuit 32 through the D/A converting circuit 34. When the sensor position signal 61' is outputted, the linear motor 3 is moved to the designated inner position by virtue of a position feedback system which includes the subtracting circuit 32, the movable part driving circuit 6, the linear motor 3, the light emitting element 4, the optical position detector 5 and the detecting circuit 31. Next, a track signal 60 at the inner circumferential position outputted from the optical head 2 is demodulated to track identification signal 62 by a data detecting circuit 38 and an identification circuit 37. A track identification signal 62 obtained is supplied to the operating circuit 35. And, the track demodulation signal 62 is stored into the memory 36. At the same time, a sensor position signal 61 (a digital version of the signal 61') corresponding to the inner circumferential position is also stored into the memory 36.

The above-mentioned consecutive operation is similarly carried out also for each of the intermediate and outer circumferential portions of the recording area of the disk 1.

At the point of time when the above operation has been completed three times, data including three kinds of sensor position signals 61 and three kinds of corresponding track identification signals 62 at the inner, intermediate and outer circumferential positions are stored in the memory 36. Though the track signal 60 and the sensor position signal 61' are amplified by respective amplifier circuits, the illustration and explanation thereof are omitted from FIG. 12 and the above description.

Next, the procedure of control in the second prior art will be explained referring to a flow chart shown in FIG. 13.

Though the above-mentioned three operation procedures A, B and C at the inner, intermediate and outer circumferential positions, there can be obtained a sensor position signal $S_a$ and a track identification signal $T_a$ at the inner circumferential position A, a sensor position signal $S_b$ and a track identification signal $T_b$ at the intermediate circumferential position B and a sensor position signal $S_c$ and a track identification signal $T_c$ at the outer circumferential position C. These signals $S_a$ to $S_c$ and $T_a$ to $T_c$ are stored in the memory 36. Next, a proportional constant $K_{ab}$ between a sensor position signal and a track identification signal in a range from the inner circumferential position A to the intermediate circumferential position B is determined by $$K_{ab} = (S_b - S_a)/(T_b - T_a).$$

The value of $K_{ab}$ is calculated and the determined value is stored into the memory 36 (steps 50 and 51).

Similarly, a proportional constant $K_{bc}$ between a sensor position signal and a track identification signal in a range from the intermediate circumferential position B to the outer circumferential position C is determined by $$K_{bc} = (S_c - S_b)/(T_c - T_b)$$

and the determined value of $K_{bc}$ is stored into the memory 36 (steps 52 and 53).

In this manner, the overall detection range of the optical position detector 5 is bisected, thereby providing two approximated linear characteristics $K_{ab}$ and $K_{bc}$.

Next, the procedure of control in the case where a target or desired track identification signal T is supplied will be explained referring to FIG. 14.

In FIG. 14, whether or not the target track identification signal T inputted at step 71 is greater than the track identification signal $T_b$ at the intermediate circumferential position is judged at step 71. If the target track identification signal T is equal to or smaller than the track identification signal $T_b$, which means that the target track is inside of the intermediate circumferential position, the proportional constant $K_{ab}$ is used and a sensor position signal S to be outputted is determined as being $$S = K_{ab}(T - T_a) + S_a$$

(step 73). On the other hand, if the target track identification signal T is greater than the track identification signal $T_b$ at the intermediate circumferential position, which means that the target track is outside of the intermediate circumferential position, the proportional constant $K_{bc}$ is used and a sensor position signal S to be outputted is determined as being $$S = K_{bc}(T - T_b) + S_b$$

(step 74).

The sensor position signal S thus determined is supplied from the operating circuit 35 to the D/A converting circuit 34 (step 75).

However, these prior arts have the following problems.

(1) Since the linear motor is moved in a so-called speed or velocity control manner in the case where access to the target track is to be made, the number of circuit components required is increased. For example, a detector for detection of the speed or velocity of the linear motor or a subtracting circuit for subtraction from a target or desired velocity signal is required. Also, a follow-up delay determined by a servo band of the feedback system is large.

(2) An error in the accuracy of positioning or location of the linear motor is produced in accordance with the eccentricity of the disk.

(3) It is necessary to correct the linear characteristic of an output signal of the optical position detector each time the disk is interchanged.

(4) An error in the accuracy of positioning of the linear motor is produced due to a change in characteristic of the optical position detector resulting from the variation of temperature or the lapse of time.

SUMMARY OF THE INVENTION

An object of the present invention is to solve the above-mentioned problems of the prior art or to provide an optical recording and reproducing system in which the number of circuit components required is small, access can be made at a high speed and the position of a moving part such as a linear motor can be detected with an excellent accuracy.

To achieve the above object, an optical recording and reproducing system according to the present invention has a construction (1) and/or (2) which will be described just in below. The construction (1) is taken in order to mainly achieve the high-speed access. The construction (2) is taken in order to mainly achieve the positioning of the moving part with the excellent accuracy. The constructions (1) and (2) may be used in combination.

(1) An optical recording and reproducing system comprising an optical head for forming a light spot onto a track in a concentric-circle or spiral form provided on a disk, a moving part including a moving mechanism for moving the optical head in the direction of radius of the disk (or in a direction orthogonal to the track), a signal detector for reproducing a signal recorded in the track of the disk by means of the optical head, an operational processing circuit for receiving an output signal of the signal detector to perform an operation for moving the moving part to a desired position, and a first D/A (digital-to-analog) converting circuit for converting an output signal of the operational processing circuit into a first analog signal, characterized in that when the moving part is to be moved to a target track, the operational processing circuit establishes the first analog signal so that it applies a positive acceleration to the moving part, reads a signal of the disk reproduced from the optical head to judge the arrival of the moving part to a position corresponding to 1/n (n: a positive real number larger than 1) of a distance to the target track by the positive acceleration, establishes the first analog signal on the basis of the result of judgement so that it applies a negative acceleration to the moving part, reads a signal of the disk reproduced from the optical head to judge the arrival of the moving part to the target track, and cancels the negative acceleration on the basis of the result of judgement.

(2) An optical recording and reproducing system comprising an optical head for forming a light spot on a track in a concentric-circle or spiral form provided on a disk, a moving part including a moving mechanism for moving the optical head in the direction of radius of the disk (or in a direction orthogonal to the track), a position detector for outputting a position signal indicative of a position of the moving part, a position detecting circuit for amplifying the position signal supplied from the position detector, an operational processing circuit for performing an operation for positioning or fixing the moving part to a desired position, a second D/A (digital-to-analog) converting circuit for an output signal of the operational processing circuit into a second analog signal, and a differential amplifier circuit for performing a subtraction of an output signal of the D/A converting circuit and an output signal of the position detecting circuit from each other (or a differential amplification), characterized by comprising a switching circuit provided between the differential amplifier circuit and the moving part and having a signal conducting and cutting-off function, and a comparing circuit for voltage-converting an output signal of the differential amplifier circuit and supplying the voltage-converted signal to the operational processing circuit.

The optical recording and reproducing system according to the present invention has the following functions.

(1) In the case where a portion or the whole of the moving part including a linear motor is to be moved to the target track, an output signal of the operative processing circuit including a microcomputer performing an operation necessary for the movement of the moving part (i.e. the calculation of a distance to the target track, etc.) is supplied to the first D/A converting circuit. Next, an output signal of the D/A converting circuit is supplied to a moving part driving circuit which in turn operates to move directly the moving part.

In general, a linear motor is employed as the moving part in order to attain high-speed access. In this case, a constant current is supplied to the linear motor so that a positive acceleration is applied to the linear motor. Next, during a period of time when the moving part is moving toward the target track, the operational processing circuit reads a signal (for example, a track address signal) on a track. In course of time, the operational processing circuit detects the arrival of the moving part to a position corresponding to about a half of the distance to the target track. Thereafter, the operational processing circuit applies a negative acceleration to the moving part so that the moving part is decelerated. Next, the arrival of the moving part to the position of the target track is detected in a similar manner as mentioned above. The operational processing circuit cancels the negative acceleration to stop the moving part.

Since a feedback control is not made for the moving part under movement, as is apparent from the foregoing, a follow-up delay upon transition from the positive acceleration to the negative acceleration (that is, a delay in response time induced by a limited servo band) is not produced.

(2) In a position control system constructed in such a manner that an output signal of the operational processing circuit performing an operation necessary for the movement of the moving part (for example, the calculation of a distance to the target track or a position voltage which designates a position of the moving part at the target track) is supplied to one input terminal of the differential amplifier circuit through the second D/A converting circuit and an output signal of the position detecting circuit indicative of a position of the moving part in the direction of radius of the disk is supplied to the other input terminal of the differential amplifier circuit, an output signal of the differential amplifier circuit is supplied to the comparing circuit for voltage conversion and an output signal of the comparing circuit is supplied to the operational processing circuit. The significance of this operation will be readily understood when considering the case where a position of the moving part is detected relative to the disk after the movement of the moving part to the target track. Namely, in the case of the position control system having the above-mentioned construction, it is required that when the moving part is moved to the target track, the operational processing circuit supplies an accurate position voltage (or an output signal which designates a position of the moving part) to the moving part positioned at the target track. Further, it is required that the position voltage does not cause any extra or unnecessary movement of the moving part. Therefore, the optical recording and reproducing system according to the present invention performs the following operation.

First, the switching circuit provided in a path from the differential amplifier circuit to the moving part is brought into its cut-off condition so that the loop of the position control system is opened. Subsequently, the value of an output signal of the operational processing circuit is increased or decreased until the logic of an output signal of the comparing circuit is inverted. At this time, an output signal of the differential amplifier circuit is not transferred to the moving part since the switching circuit is in the cut-off condition. Accordingly, any erroneous operation such as extra movement of the moving part does not take place. Also, a voltage indicative of a position of the moving part relative to the disk is supplied to the other input terminal of the differential amplifier circuit (i.e. an input terminal thereof other than the input terminal to which the signal from the operational processing circuit is supplied) and the output signal of the comparing circuit is passed through the differential amplifier circuit. Therefore, the inversion of the logic of the output signal of the comparing circuit means that the value of the output signal of the operational processing circuit is larger (or smaller) than the practical position voltage value for the moving part. Accordingly, the subsequent operation includes decreasing (or increasing) the value of the output signal of the operational processing circuit. This operation is continued until the logic of the output signal of the comparing circuit is inverted.

By repeating the above-mentioned operation, the value of the output signal of the operational processing circuit ultimately becomes equal to the practical position voltage value for the moving part. Thereafter, in a state in which the value of the output signal of the operational processing circuit is held, the switching circuit is rendered conductive so that the loop of the position control system is closed.

The effects of the present invention are as follows.

(1) In the case where access to the target track is to be made, since the output signal of the operational processing circuit including a microcomputer is supplied to the moving part (or the linear motor) through the D/A converting circuit to apply an acceleration to the moving part (or the linear motor) and no feedback to the moving part is made in this period of time (that is, an open loop control is made), the follow up delay of the moving part which has been frequently generated as an obstacle in the conventional feedback control system be eliminated and hence it is possible to move the part at a high speed. Also, since circuit components including a detector for detection of the speed or velocity of the moving part (or the linear motor) or a subtracting circuit for subtraction from a target velocity signal which have been required for the conventional velocity control system are not necessitated, thereby making the construction of a control system simple.

(2) In the case where the moving part (or the linear motor) is driven by the position control system, the position of the moving part immediately after the movement thereof can be accurately detected with no influence of a change in characteristic of the position detector resulting from the variation of temperature or the lapse of time. Also, since there is involved no relation with a signal recorded in the track on the disk, there is no influence of the decrease of the reproduced signal from the disk which may be caused by dust, defect, or some other reasons. Further, an accurate position of the moving part can be detected against the eccentricity of the disk.

DESCRIPTION OF THE PREFERRED EMBODIMENTS

Embodiments of an optical recording and reproducing system according to the present invention will now be explained in detail by virtue of the accompanying drawings.

Figure 1:
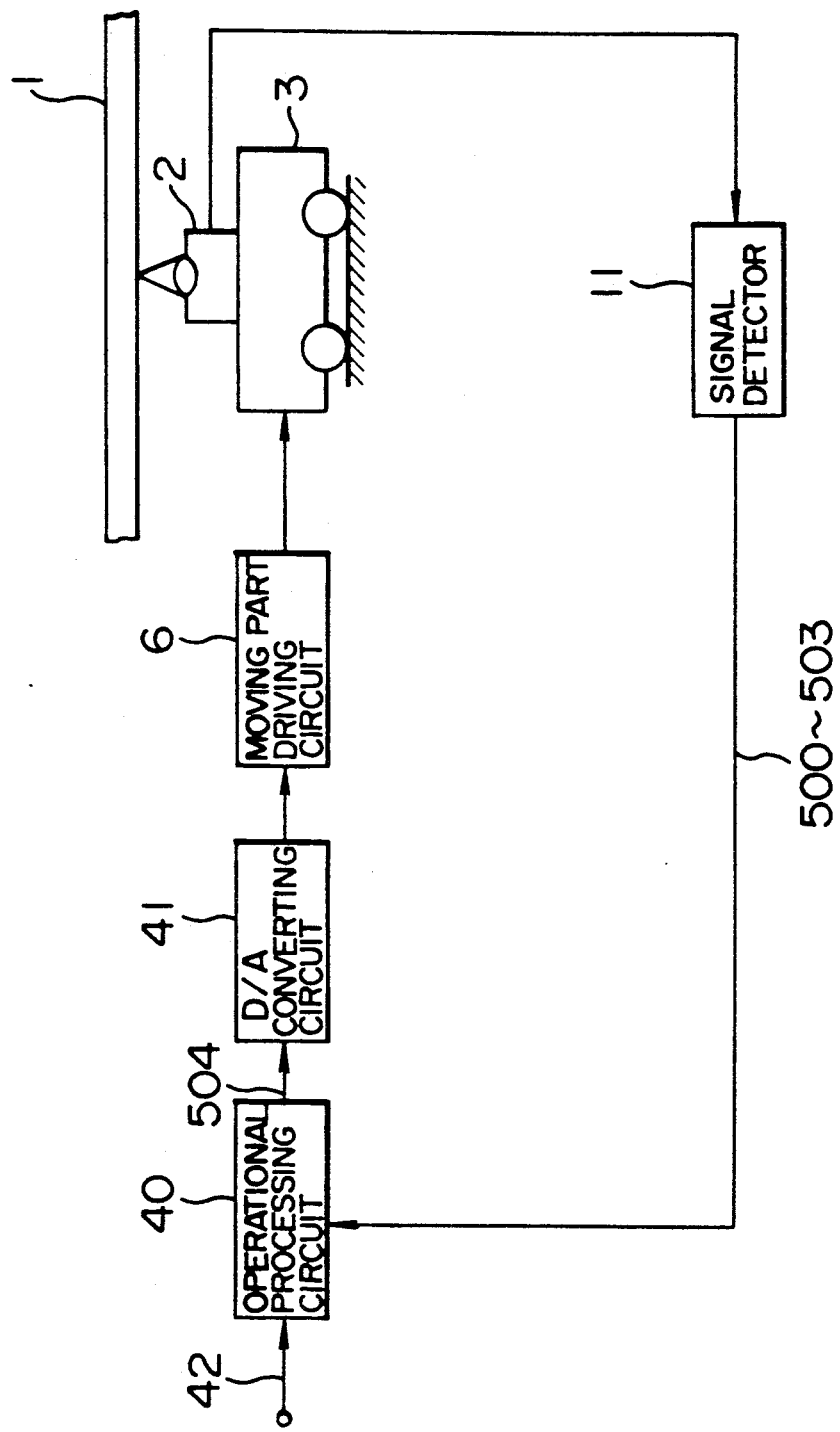
FIG. 1 is a block diagram showing the construction of an optical recording and reproducing system according to a first embodiment of the present invention.
Figure 3:
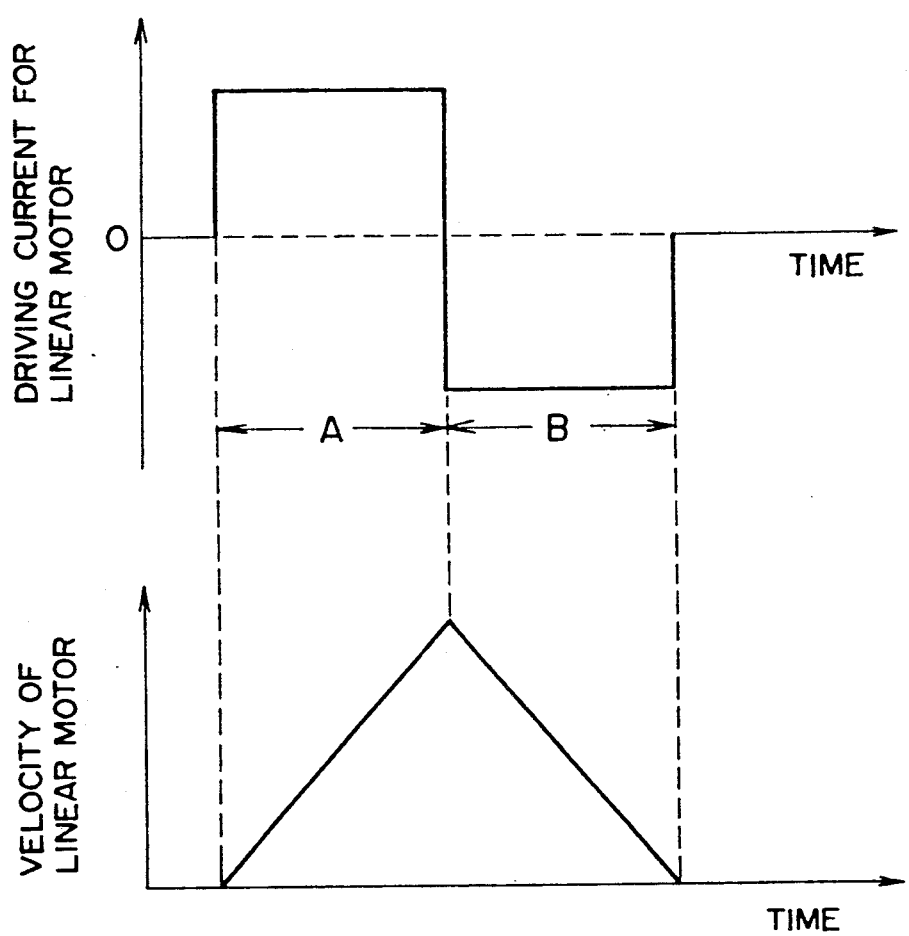
FIG. 3 is a view showing the waveform of a driving current for a linear motor and the waveform of velocity of the linear motor in the first embodiment of the present invention.
Figure 12:
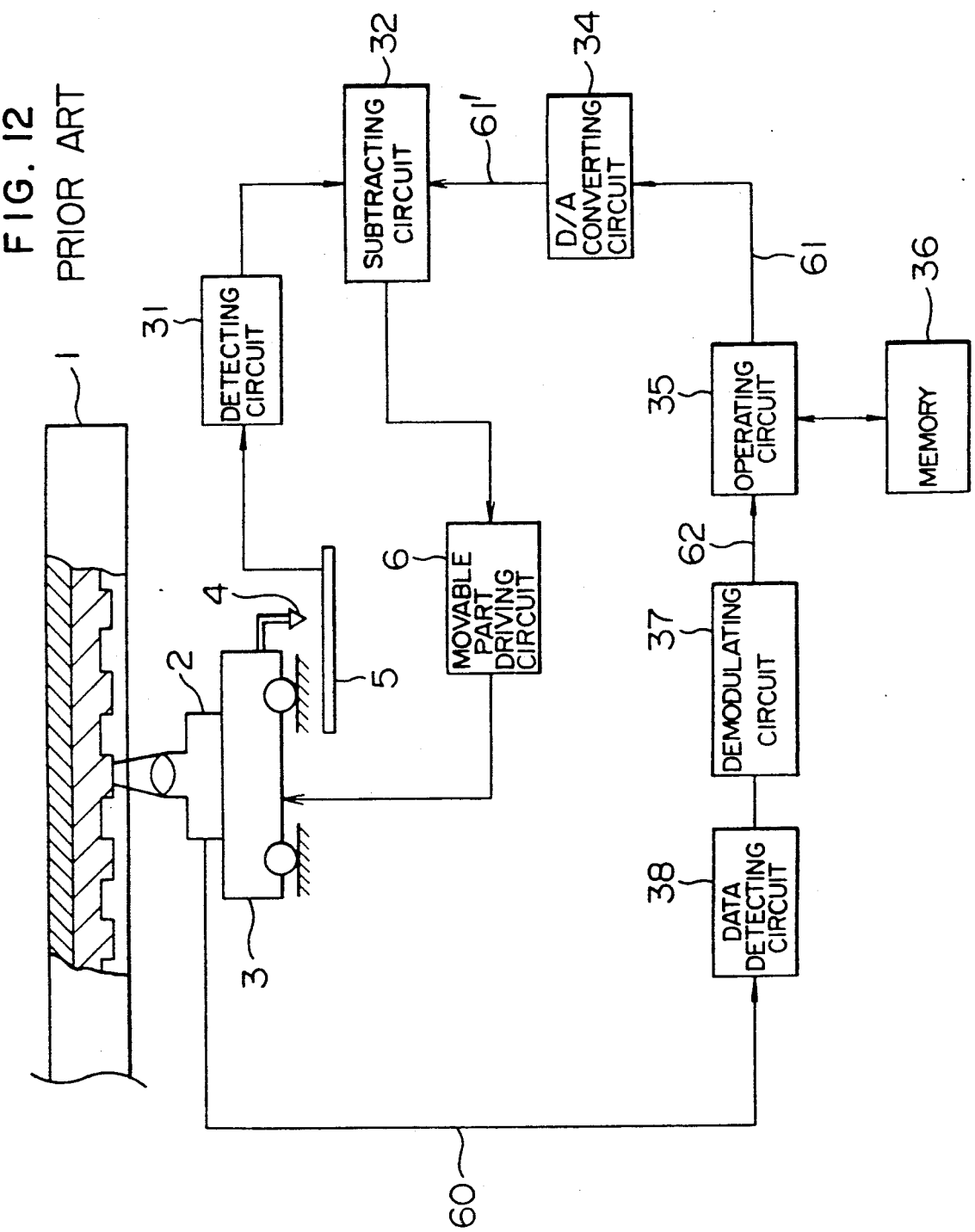
FIG. 12 is a block diagram showing the construction of an optical recording and reproducing system according to a second prior art.
Figure 13:
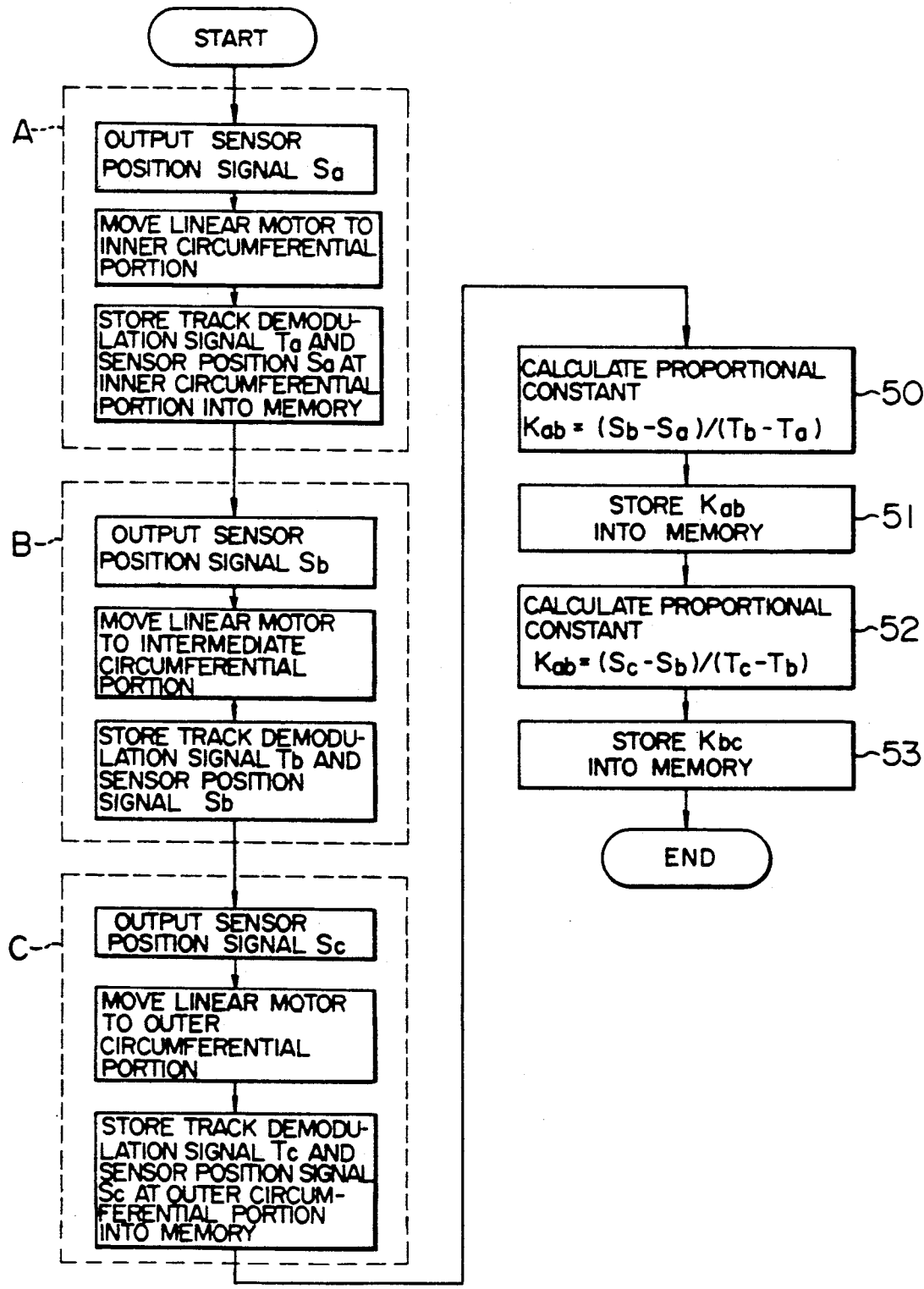
FIG. 13 is a flow chart showing a control procedure in the second prior art shown in FIG. 12.
Figure 14:
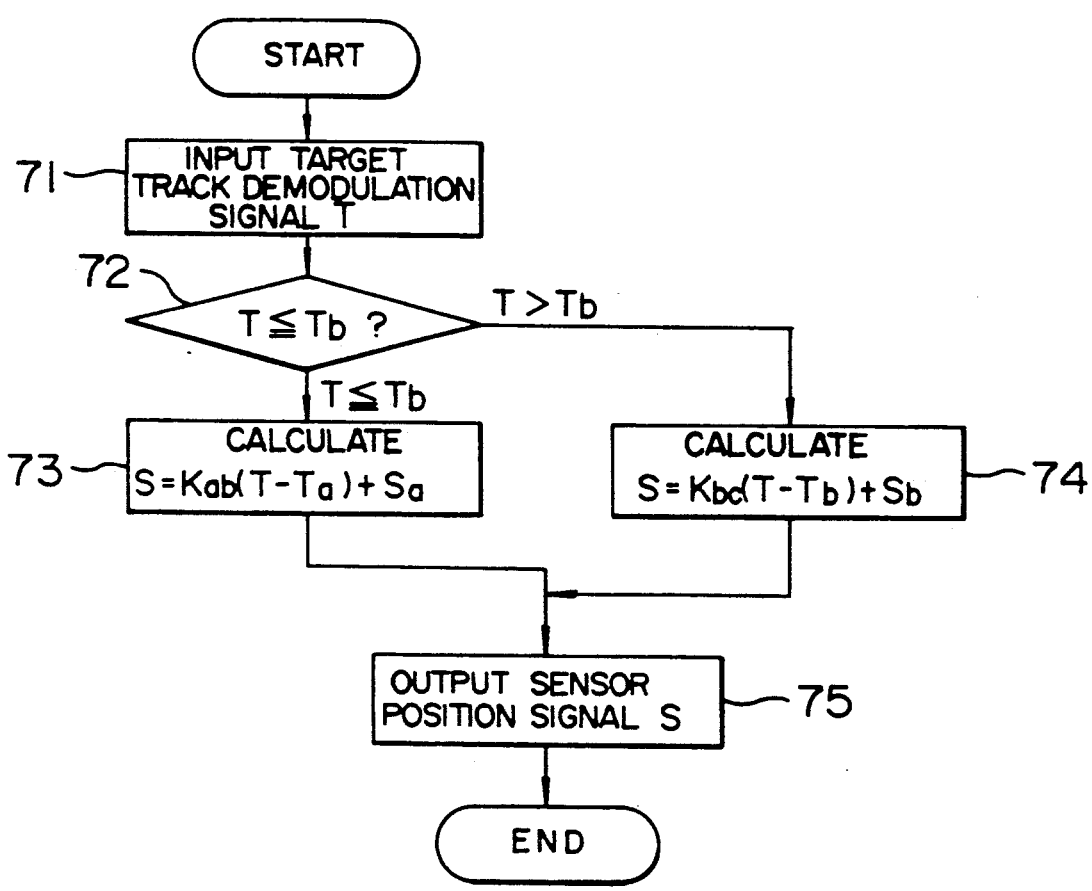
FIG. 14 is a flow chart showing a control procedure in the second prior art in the case where a target track identification signal T is supplied.

A first embodiment of the optical recording and reproducing system according to the present invention is shown in FIGS. 1 and 3. Components indicated in FIG. 1 by the same reference numerals as the components shown in FIG. 12 have the same functions as the components of FIG. 12 and hence any further explanation thereof will be omitted. In FIG. 1, reference numeral 11 designates a signal detector which detects, a part of a reproduction signal of a disk 1. signals 500–503 necessary for movement of a linear motor 3, for example, a signal representative of an address recorded in a track or the number of tracks which the linear motor 3 passes (or crosses). Numeral 40 designates an operational processing circuit which may include a microcomputer and a memory, numeral 41 a D/A (digital-to-analog) converting circuit, and numeral 42 a movement command terminal which is supplied with an instruction necessary for driving the linear motor 3, that is, data including information concerning a target or desired track. FIG. 3 is a view showing the waveform of a driving current for the linear motor 3 and the waveform of velocity of the linear motor in the first embodiment.

Now consider that an instruction for movement to a target track is supplied from the movement command terminal 42. Then, the operative processing circuit 40 determines a distance over which the linear motor 3 should move and a direction in which the linear motor should move. The operative processing circuit 40 supplies a driving current necessary for movement of the linear motor 3 to the linear motor 3 through the D/A converting circuit 41 and a moving part driving circuit 6 so that a positive acceleration is applied to the linear motor 3. Under accelerative movement of the linear motor 3 (or in a period of time A shown in FIG. 3), the operative processing circuit 40 judges the arrival of the linear motor 3 to a position corresponding to a half of the distance to the target track on the basis of a signal representative of the track address number or the number of passed tracks outputted from the signal detector 11. In turn, the operative processing circuit 40 applies a negative acceleration to the linear motor 3. Namely, a driving current to decelerate the linear motor 3 is flown through the linear motor 3. Under decelerative movement of the linear motor 3 (or in a period of time B shown in FIG. 3), the operative processing circuit 40 judges the arrival of the linear motor 3 to the target track on the basis of the track address number or the like. After the judgement, the operative processing circuit 40 stops the supply of the driving current to the linear motor 3 through the D/A converting circuit 41 and the moving part driving circuit 6.

Figure 4:
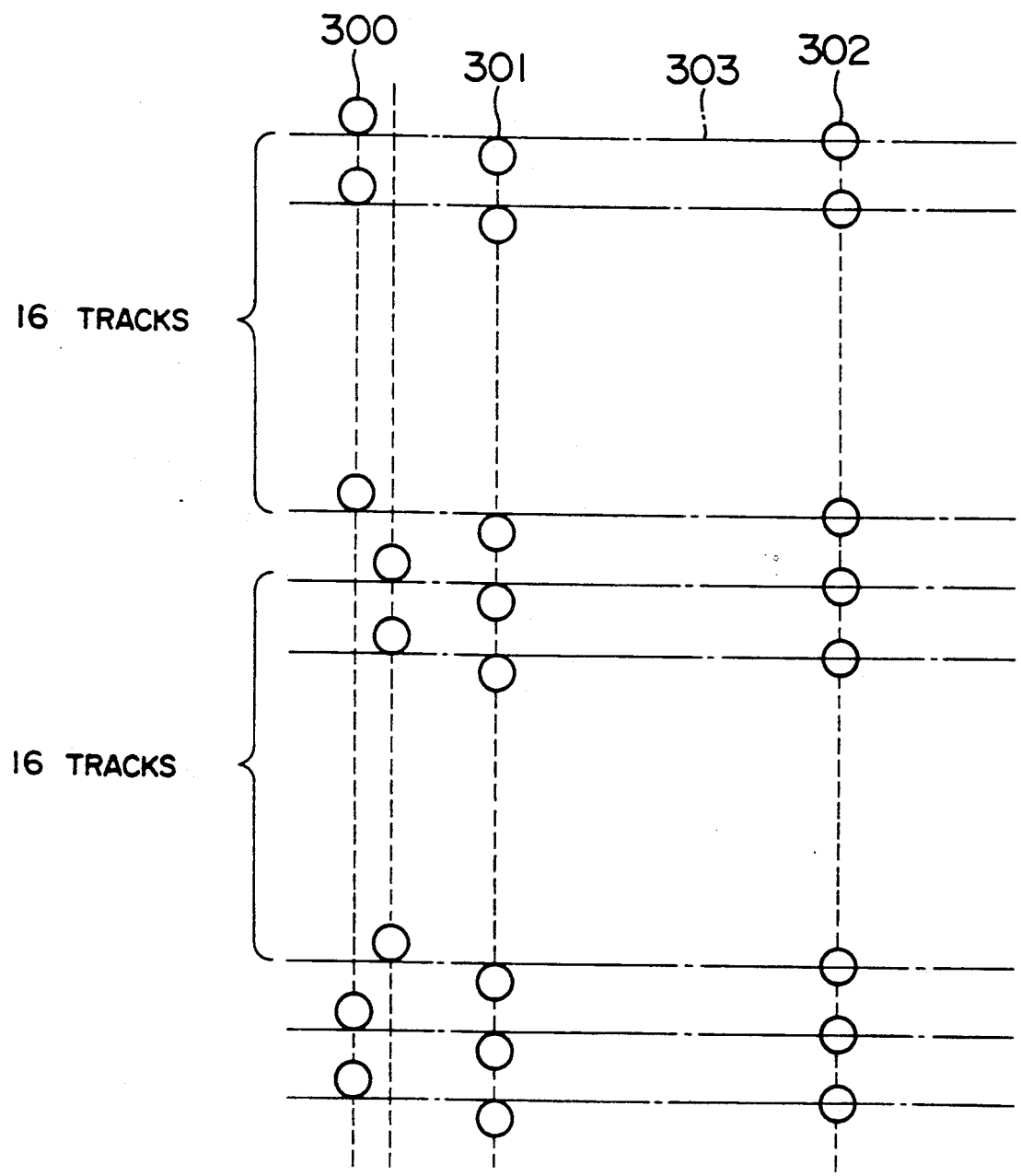
FIG. 4 is a view showing a train of pits provided in a disk.

Though detailed description of the disk is omitted from the above explanation, as a tracking technique is known a method in which pits are preliminarily formed in a track at constant intervals and a tracking signal is produced on the basis of signals reproduced from those pits (see SPIE Proceeding, Vol. 695, Optical Mass Data Storage II, pp. 112–115, 1986). According to this method, pits 300 and 301 for detection of a tracking error signal are provided, as shown in FIG. 4. The pits 300 and 301 are shifted in opposite directions with respect to an imaginary track center 303 by ¼ track pitch. A pit 302 is provided for clock reproduction. The pit 302 is positioned on the imaginary track center 303. The tracking error signal is obtained by the signal detector 11 in a form of a difference in amplitude between signals reproduced from the pits 300 and 301. The pits 300 are shifted by one clock every 16 tracks. Therefore, a MOD (modulo) 16 signal is outputted from the signal detector 11 as the linear motor 3 moves. This MOD 16 signal outputted every 16 tracks is a signal indicative of the movement of the linear motor 3.

Next, a second embodiment of the optical recording and reproducing system according to the present invention will be explained by use of FIGS. 2, 5 and 6.

Figure 2:
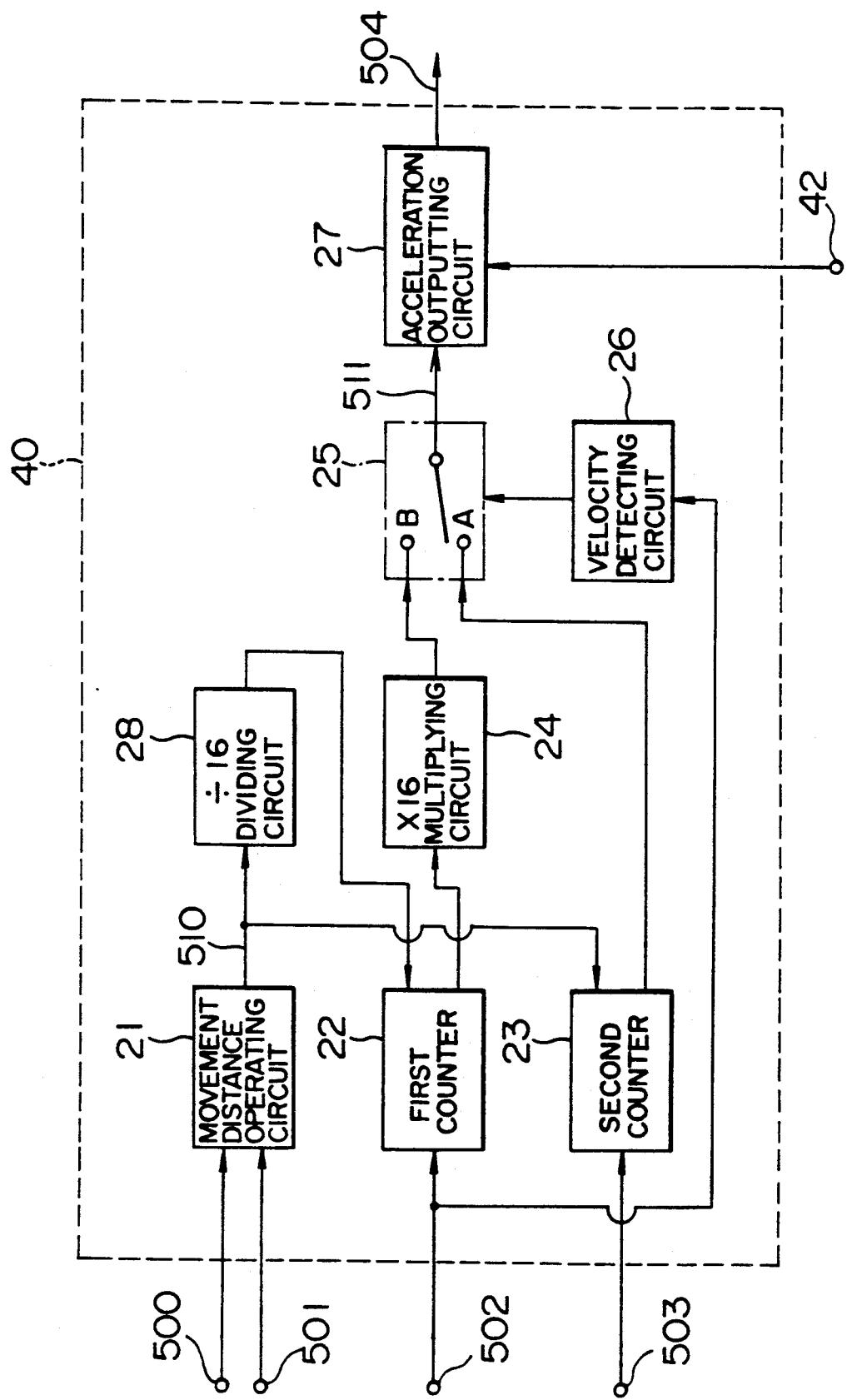
FIG. 2 is a block diagram showing the construction of an operational processing circuit shown in FIG. 1.
Figure 5:
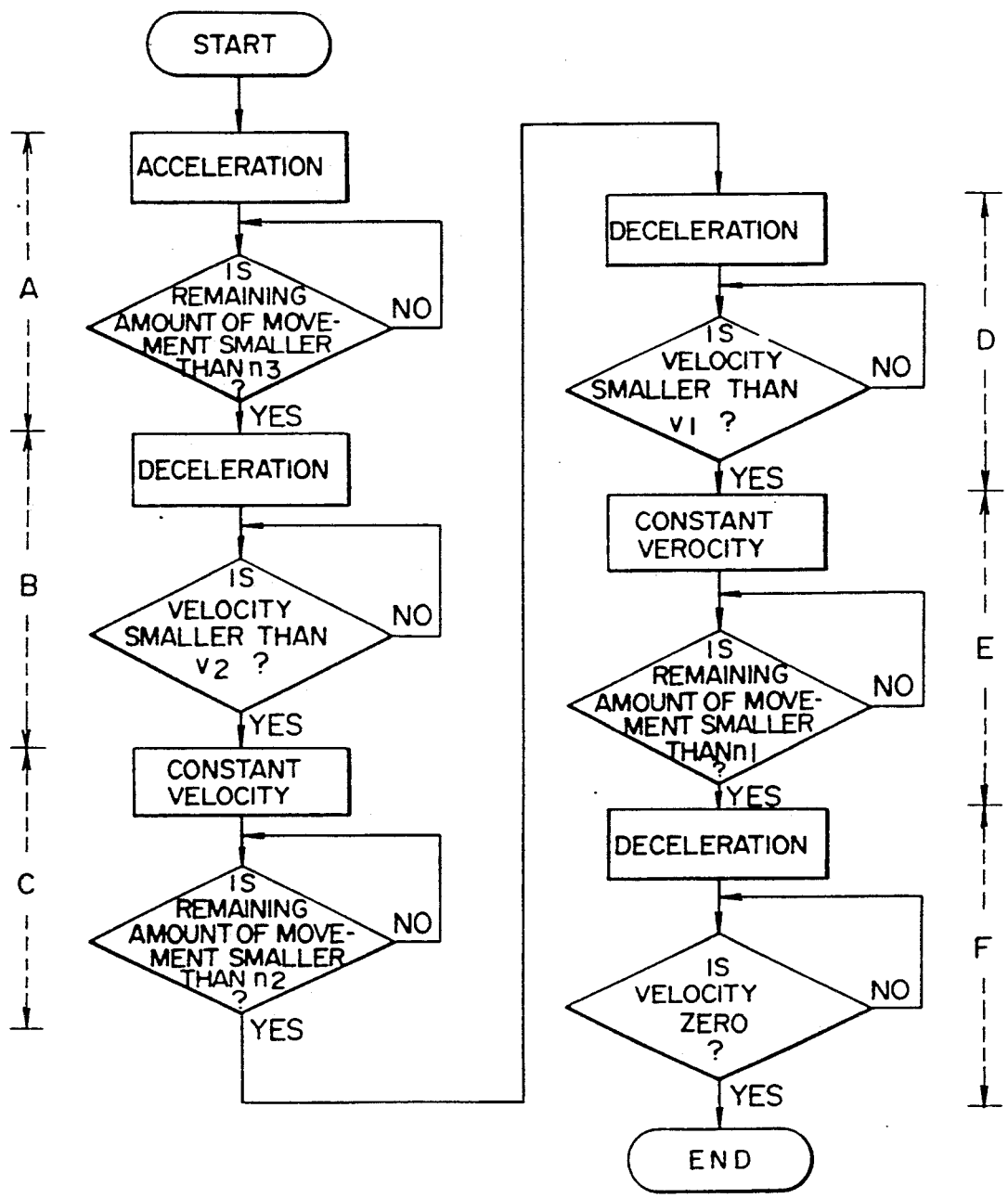
FIG. 5 is a flow chart which is helpful to explain a second embodiment of the present invention and shows the control operation of an acceleration outputting circuit shown in FIG. 2.
Figure 6:
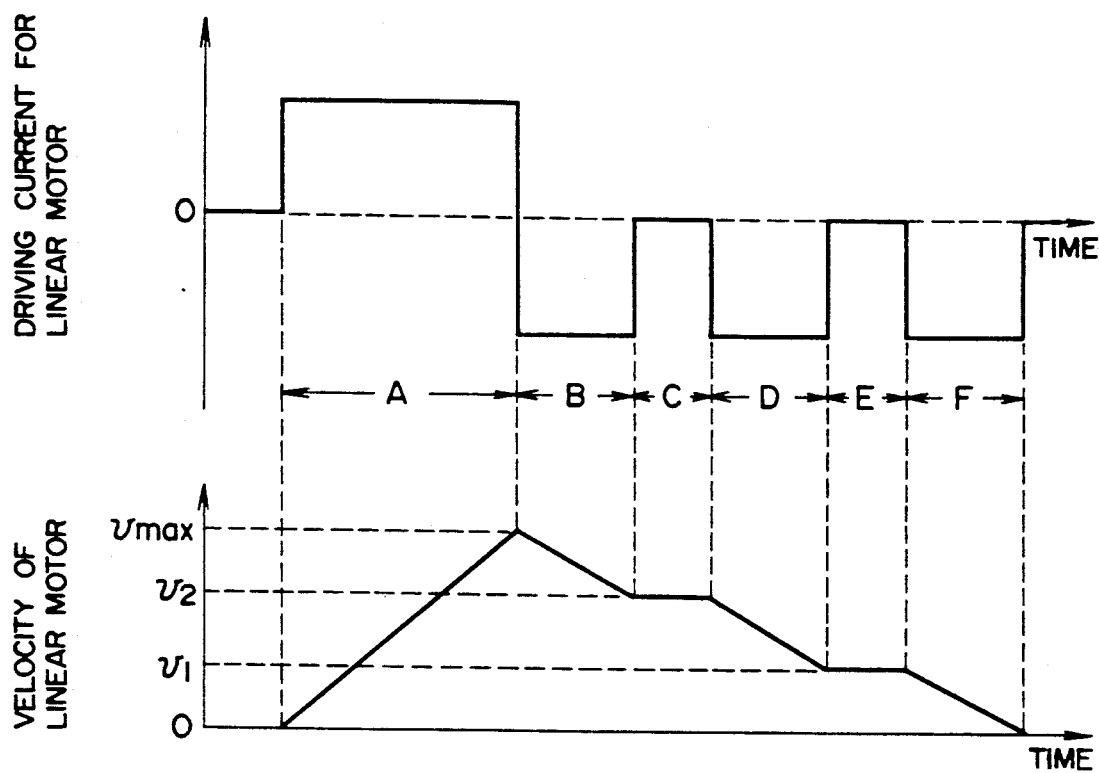
FIG. 6 is a view showing the waveform of a driving current for a linear motor and the waveform of velocity of the linear motor in the second embodiment of the present invention.

FIG. 6 is a view showing the waveform of a driving current for the linear motor 3 and the waveform of velocity of the linear motor 3 in the second embodiment, FIG. 2 is a block diagram showing the detailed construction of the operational processing circuit 40 shown in FIG. 1, and FIG. 5 is a flow chart showing the control operation of a acceleration outputting circuit 27 shown in FIG. 2. The main construction of the system according to the second embodiment is the same as the construction shown in FIG. 1.

Referring to FIG. 2, the operational processing circuit 40 includes a movement distance operating or determining circuit 21, a first counter 22, a second counter 23, a ×16 multiplying circuit 24, a first switch 25 for change-over of counters, a velocity detecting circuit 26, an acceleration outputting circuit 27 and a ÷16 dividing circuit 28.

The first counter 22 is supplied with a MOD 16 signal 502. The MOD 16 signal 502 is outputted in the form of a pulse each time the optical head 2 radially moves over 16 tracks on the disk 1. Therefore, a version of the count value of the first counter 22 multiplied by 16 in the ×16 multiplying circuit 24 indicates the number of tracks which the optical head 2 passes when the optical head 2 is actually moved in the direction of radius of the disk 1 by the linear motor. The second counter 23 is supplied with a cross track signal 503. The cross track signal 503 is outputted in the form of a pulse each time the optical head 2 moves over one track in the direction of radius of the disk 1. Therefore, the count value of the second counter 23 indicates the number of tracks which the optical head 2 passes when the optical head 2 is actually moved in the direction of radius of the disk 1 by the linear motor 3. The cross track signal 503 can be used only in the case where a relative velocity between the moving optical head 2 and the disk 1 is very low.

An address signal 500 representative of an address recorded in a track on the disk 1 and a timing signal 501 representative of a timing for rewrite of address are supplied from the signal detector 11 to the movement distance operating circuit 21. The movement distance operating circuit 21 calculates a difference between an address upon start of the movement of the optical head 2 and an address under movement thereof and the value of the determined difference is outputted as a signal 510 representative of the number of passed tracks when the optical head 2 is moved. The signal 510 is written into the second counter 23 and also into the first counter 22 through the ÷16 dividing circuit 28. As a result, the count value of the cross track signal 503 or the MOD 16 signal 502 is modified or corrected by the value of an address recorded in a track of the disk 1. These processings (the calculation of the number of passed tracks upon movement of the optical head 2 in the direction of radius of the disk 1 and the rewrite of the first counter 22 and the second counter 23) are performed when the movement distance operating circuit 21 detects an address rewrite timing recorded in a track on the disk 1 by virtue of the timing signal 501.

The velocity detecting circuit 26 detects the velocity of movement of the optical head 2 on the basis of an interval between pulses in the MOD 16 signal (or a time required for movement of the optical head 2 over 16 tracks). Upon movement of the linear motor 3 at a low velocity (or a velocity at which the cross track signal 503 can be counted by the second counter 23), the velocity detecting circuit 26 connects the switch 25 to its terminal A side. Upon movement of the linear motor 2 at a high velocity, the velocity detecting circuit 26 connects the switch 25 to its terminal B side. A track traverse signal 511 passed through the switch 25 indicates the number of passed tracks when the optical head 2 is moved in the direction of radius of the disk 1. Namely, the track traverse signal 511 based on the cross track signal 503 is outputted upon the low-velocity movement and the track traverse signal 511 based on the MOD 16 signal 502 is outputted upon the high-velocity movement. The track traverse signal 511 is the count value of the cross track signal 503 or the MOD 16 signal 502 modified by the track address value.

The acceleration outputting circuit 27 outputs an acceleration control signal 504 conformable to the track traverse signal 511. The velocity of movement of the linear motor 3 is controlled by the acceleration control signal 504. When the optical head 2 is to be moved, the acceleration outputting circuit 27 outputs the acceleration control signal 504 which brings the output signal of the D/A converting circuit 41 (see FIG. 1) into a positive voltage. Thereby, the linear motor 3 is accelerated. Here, it is assumed for convenience of explanation that the linear motor 3 is accelerated when the acceleration control signal 504 or the output signal of the D/A converting circuit 41 is a positive voltage and decelerated when it is a negative voltage.

As illustrated in FIGS. 5 and 6, the acceleration is made until the remaining amount of movement becomes smaller than $n_3$ (or during a period of time A shown in FIG. 6). It is preferable that $n_3$ is set to about a half of the number n of tracks which the linear motor 3 should pass for the movement thereof to the target track. Next, the acceleration outputting circuit 27 outputs the acceleration control signal 504 which brings the output signal of the D/A converting circuit 41 into a negative voltage. Thereby, the linear motor 3 is decelerated. The deceleration is made until the movement velocity of the linear motor 3 moving in the direction of radius of the disk 1 becomes smaller than $v_2$ (or during a period of time B).

Thereafter, the acceleration outputting circuit 27 outputs the acceleration control signal 504 which brings the output signal of the D/A converting circuit 41 into zero. Strictly speaking, however, the acceleration control signal 504 is outputted so as to bring the output signal of the D/A converting circuit 41 into a positive small voltage, in order to compensate a loss in the moving mechanism. Thereby, the linear motor 3 is moved at a constant velocity. This control at the constant velocity is made until the remaining amount of movement becomes smaller than $n_2$ (or during a period of time C). It is preferable that $n_2$ is set to about one fifth of the number n of tracks which the linear motor 3 should pass for the movement thereof to the target track. Next, the acceleration control signal 504 is outputted to bring the output signal of the D/A converting circuit 41 into a negative voltage again so that the movement velocity of the linear motor 3 is decelerated. The deceleration is made until the movement velocity of the linear motor 3 becomes smaller than $v_1$ (or during a period of time D). Thereafter, the acceleration control signal 504 is outputted to bring the output signal of the D/A converting circuit 41 into zero (strictly, a positive small voltage) so that the linear motor 3 is moved at a constant velocity. This control at the constant velocity is made until the remaining amount of movement becomes smaller than $n_1$ (or during a period of time E). It is preferable that $n_1$ is set to about one twentieth of the number n of tracks which the linear motor 3 should pass for the movement thereof to the target track. Further, the acceleration control signal 504 is outputted to bring the output signal of the D/A converting circuit 41 into a negative voltage so that the linear motor 3 is decelerated. The deceleration is made until the movement velocity of the linear motor 3 becomes zero (or during a period of time F).

Through the above-mentioned control, the movement of the moving part (including the linear motor 3 and the optical head 2) to the target track is realized. Provided that the number of passed tracks required for the movement to the target track is n, the value of each of $n_1$, $n_2$ and $n_3$ may be an arbitrary positive integer so long as they generally satisfies a relation of $n > n_3 > n_2 > n_1$. Provided that the maximum velocity of the linear motor 3 under movement (upon change-over between the periods A and B) is $v_{max}$, the value of each of $v_1$ and $v_2$ may be an arbitrary positive value so long as they satisfy a relation of $v_{max} > v_2 > v_1$. The maximum velocity $v_{max}$ is determined by an allowable current capable of being flown through the linear motor 3 and a thrust constant of the linear motor 3.

By the above processing, any influence of a positional error which may be produced in the deceleration periods indicated by B and D can be eliminated. For example, even if a positional error is produced in the period B, the influence of this error is not exerted on the subsequent processing since the velocity of the linear motor and the remaining amount of movement become $v_2$ and $n_2$, respectively, upon termination of the period C. Similarly, even if a positional error is produced in the period D, the velocity of the linear motor and the remaining amount of movement become $v_1$ and $n_1$, respectively, upon termination of the period E. Accordingly, only a positional error produced in the period F results in a positional error which may be produced in the present processing.

Since the modification for the number of remaining tracks which the linear motor 3 should pass is thus made in the two constant-velocity periods C and E, the accuracy of position of the moving part upon movement of the moving part to the target track is improved. In general, the number of constant-velocity periods may be arbitrary though two constant-velocity periods C and E have been employed by way of example in the foregoing explanation. Also, though the output signal of the D/A converting circuit 41 in the periods C and E has been set to a positive small voltage, it may be set to zero with no problem if a loss in the moving mechanism is small.

Next, a third embodiment shown in FIG. 7 will be explained.

Figure 7:
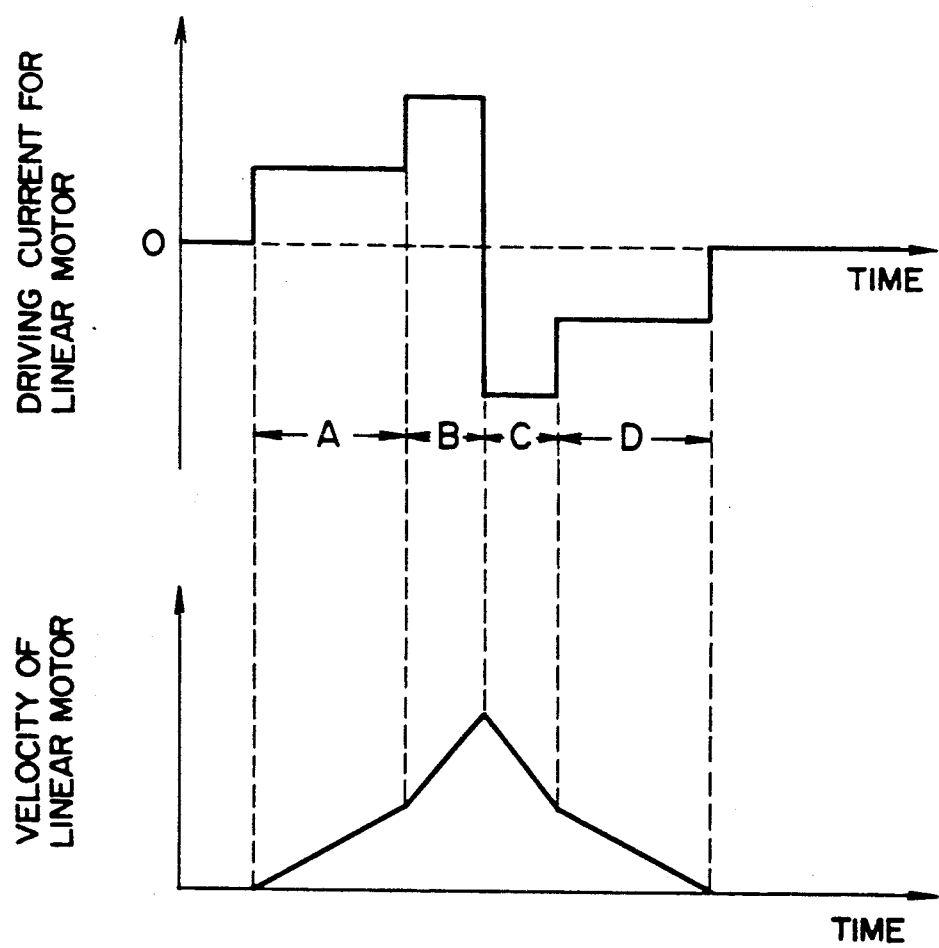
FIG. 7 is a view showing the waveform of a driving current for a linear motor and the waveform of velocity of the linear motor in a third embodiment of the present invention.

Referring to FIG. 7, two acceleration periods A and B are provided and the acceleration in the period B is twice as large as that in the period A. By thus providing the high-velocity acceleration in the course of movement, an error of the position of the moving part from the position of the target track can be reduced as greatly as possible. As for deceleration periods C and D, the acceleration in the period D is set to about a half of that in the period C, thereby improving the accuracy of stop operation of the moving part.

Next, explanation will be made of embodiments for strictly or accurately positioning or locating the optical head into the position of a desired track. The constructions of those embodiments and the construction of the foregoing embodiments can be changed over from each other by switching means (not shown) but a further explanation thereof will be omitted.

A fourth embodiment of the present invention shown in FIGS. 8 and 9 will now be explained.

Figure 8:
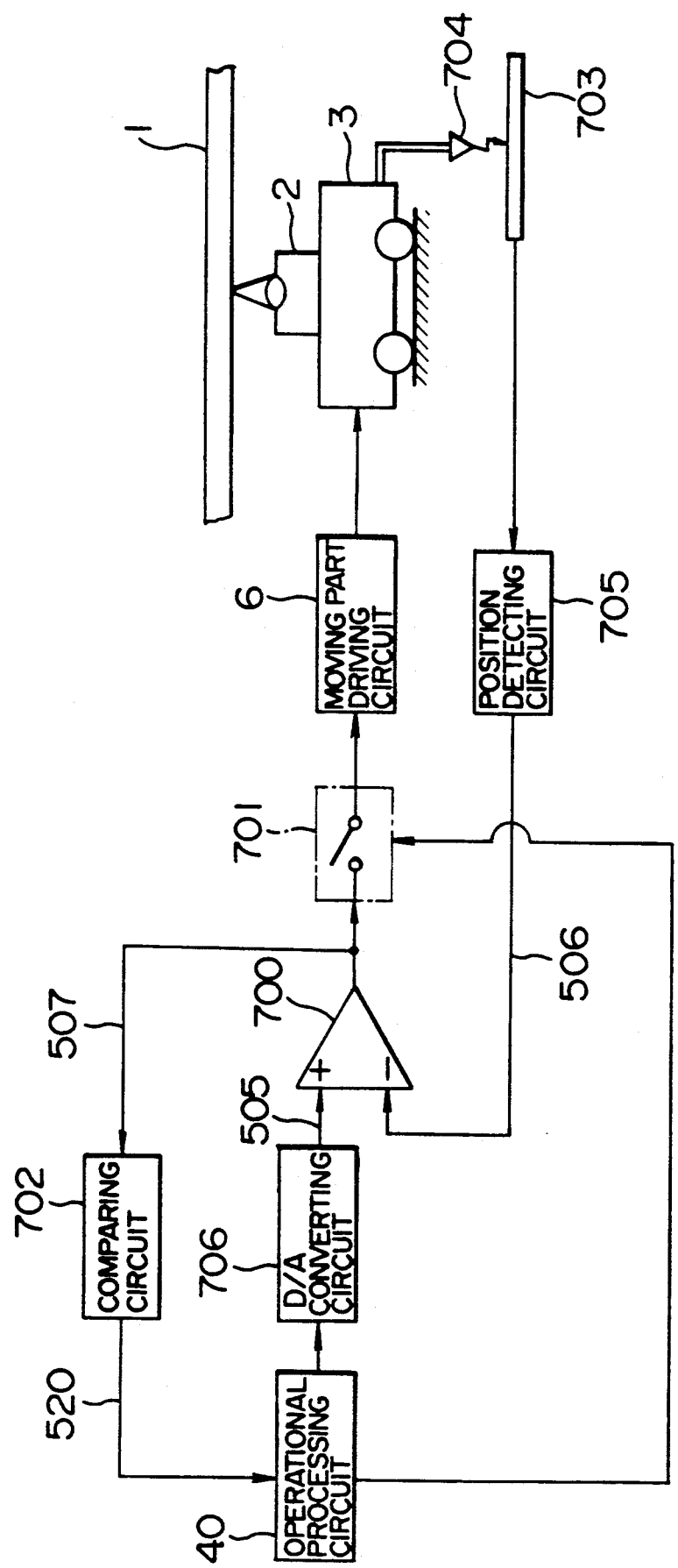
FIG. 8 is a block diagram showing the construction of an optical recording and reproducing system according to a fourth embodiment of the present invention.

In FIG. 8, reference numeral 700 a differential amplifier circuit, numeral 701 a switching circuit (or a second switch), numeral 702 a comparing circuit, and numeral 703 a position detector which receives light emitted from a light emitting element 704 to output a signal indicative of a position of the linear motor 3. An output signal 520 of the comparing circuit 702 takes a low (L) level when a sensor position control voltage 505 is larger than a sensor position voltage 506 and a high (H) level when the sensor position control voltage 505 is smaller than the sensor position voltage 506. Usually, the switching circuit 701 is in its conducting condition. An output signal of the operative processing circuit 40 is supplied as the sensor position control voltage 505 to the differential amplifier circuit 700 through the second D/A converting circuit 706. Further, the sensor position voltage 506 is supplied from a position detecting circuit 705 to the differential amplifier circuit 700. An output signal of the differential amplifier circuit 700 is supplied to the linear motor 3 through the moving part driving circuit 6.

The following explanation will be made in conjunction with the case where an accurate position of the linear motor 3, for example, after movement of the linear motor 3 to the target track is detected in a position control system in which the linear motor 3 is fixed at any given position in the direction of radius of the disk 1. First, the switching circuit 701 is brought into its cut-off condition. Next, a movement processing section (not shown) operates to linear motor 3 to the position of the target track. Thereafter, the operational processing circuit 40 performs a processing based on a flow chart shown in FIG. 9. In FIG. 9, $R_1$ and $R_2$ are general-purpose registers and $C_1$ is a loop counter. It is assumed that a range of values which the sensor position voltage 506 can take is $E_{AL}$ to $E_{AH}$ and the sensor position voltage to be obtained is $E_T$. The control operation of the operational processing circuit 40 will be explained in below by virtue of FIG. 9.

First, $(E_{AH}+E_{AL})/2$ and $(E_{AH}-E_{AL})/2$ are stored into the resisters $R_1$ and $R_2$, respectively (step 401). The value of $(E_{AH}-E_{AL})$ indicates the range of the variation of the actual sensor position voltage 506.

Next, the number N of times of looping is set to the counter $C_1$ (Step 401). Though a more accurate position of the linear motor 3 can be detected as the value of N becomes larger, the value of N is usually selected to be about 10 (ten), taking a time for operative processing into consideration.

Then, $R_2/2$ is set into the register $R_2$ (step 403). Thereafter, the value of the register $R_1$ is set as the position control voltage 505 (step 404).

In step 405, whether the output signal 520 of the comparing circuit 702 takes the low (L) level or the high (H) level is judged. If the output signal 502 of the comparing circuit 702 takes the L level, $(R_1-R_2)$ is stored into the register $R_1$ (step 406). On the other hand, if the output signal 520 of the comparing circuit 702 takes the H level, $(R_1+R_2)$ is stored into the register $R_1$ (step 407).

Next, the count value of the counter $C_1$ is decreased by 1 (one) (step 408). In step 409, whether or not the count value of the counter $C_1$ is zero is judged. When the counter value of the counter $C_1$ becomes zero, the processing is terminated. Otherwise, the process is returned to step 403.

By the above processing, it is possible to bring the value of the sensor position control voltage 505 upon completion of the control operation into a value sufficiently close to the sensor position voltage $E_T$. An error at this time (or a difference between the value of the sensor position control voltage 505 and the value $E_T$ of the sensor position voltage 506) is smaller than $(E_{AH} - E_{AL})/2^N$.

According to the above method, the processing can be made at a high speed and with an excellent accuracy.

Figure 10:
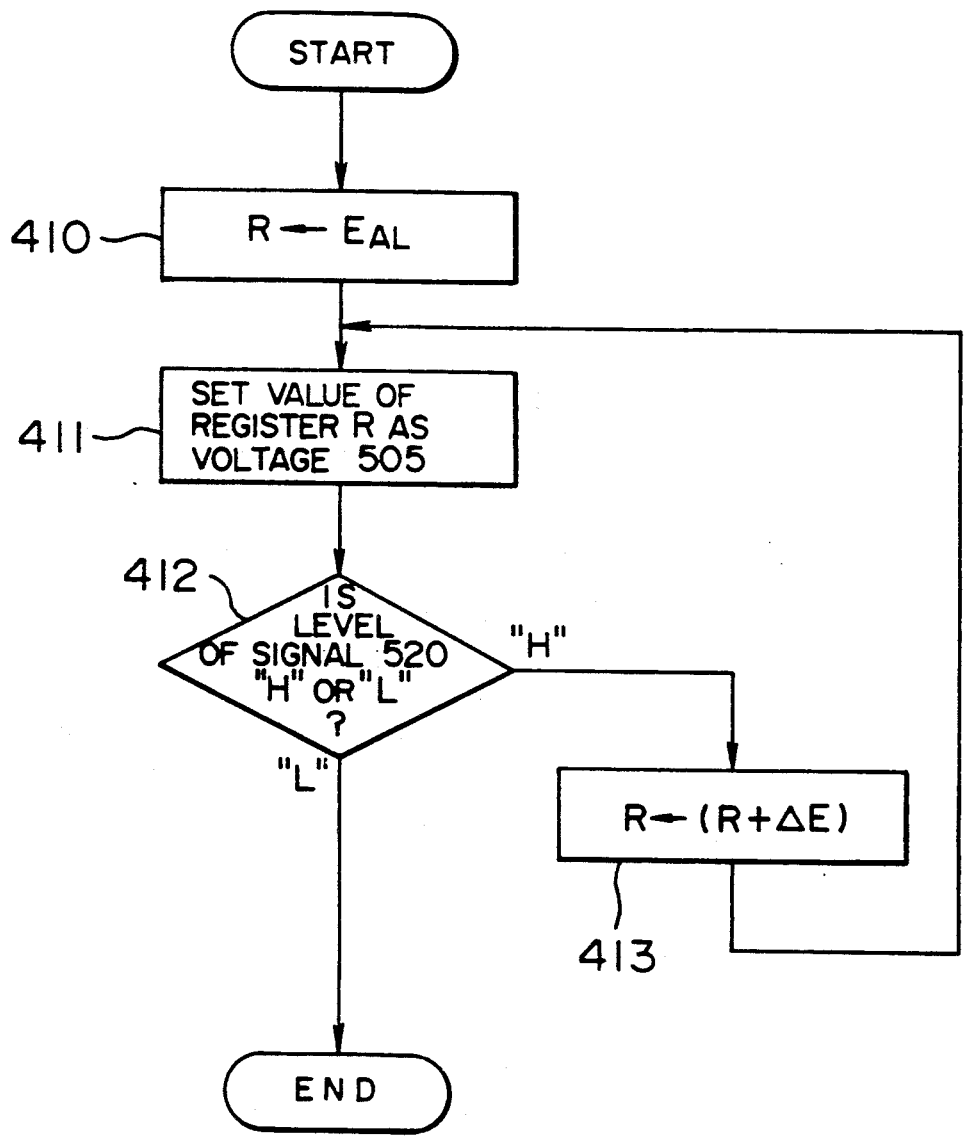
FIG. 10 is a flow chart which is helpful to explain a fifth embodiment of the present invention and shows the control operation of the operational processing circuit shown in FIG. 8.
Figure 11:
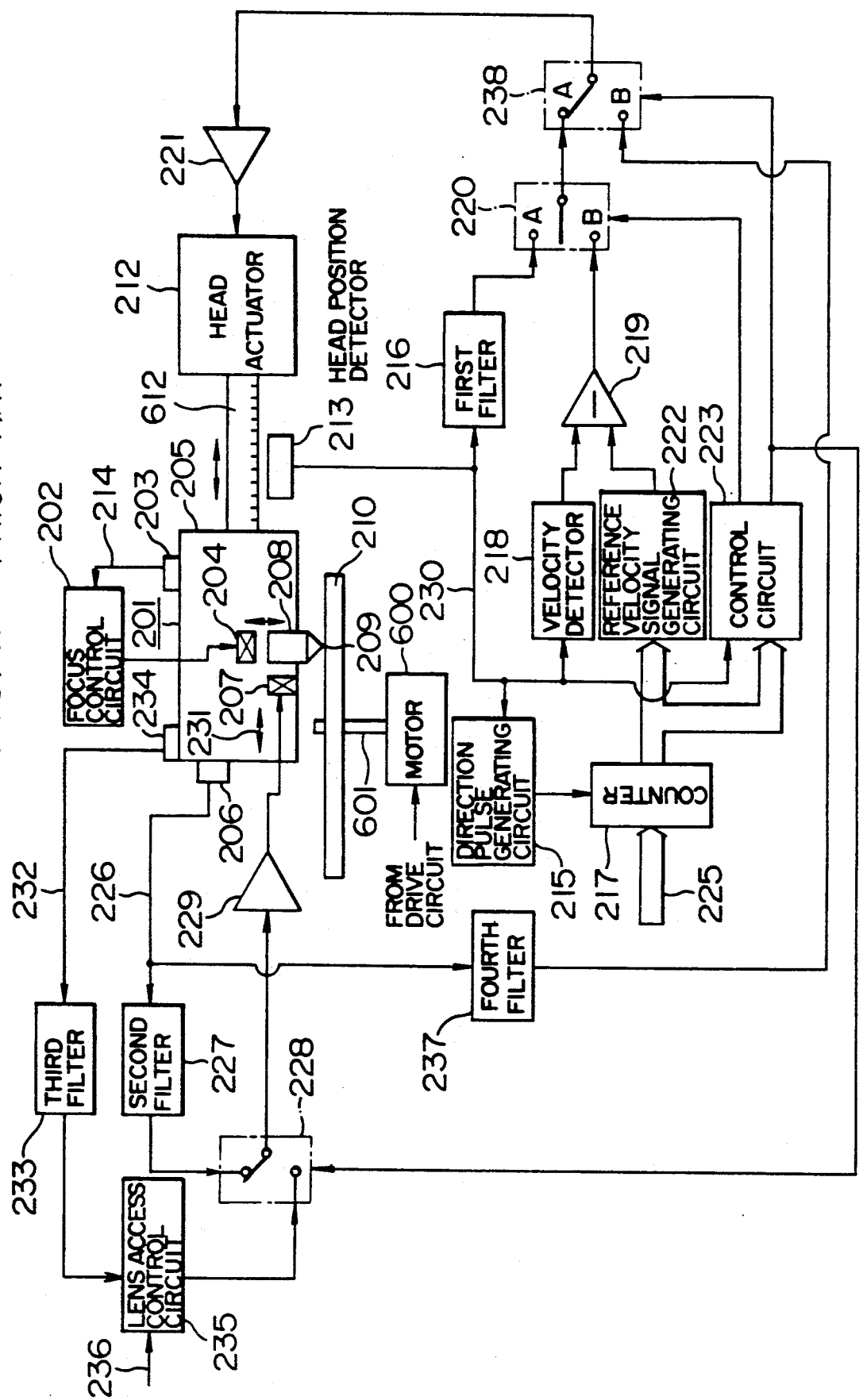
FIG. 11 is a block diagram showing the construction of an optical recording and reproducing system according to a first prior art.

Next, a fifth embodiment of the present invention shown in FIG. 10 will be explained.

Figure 9:
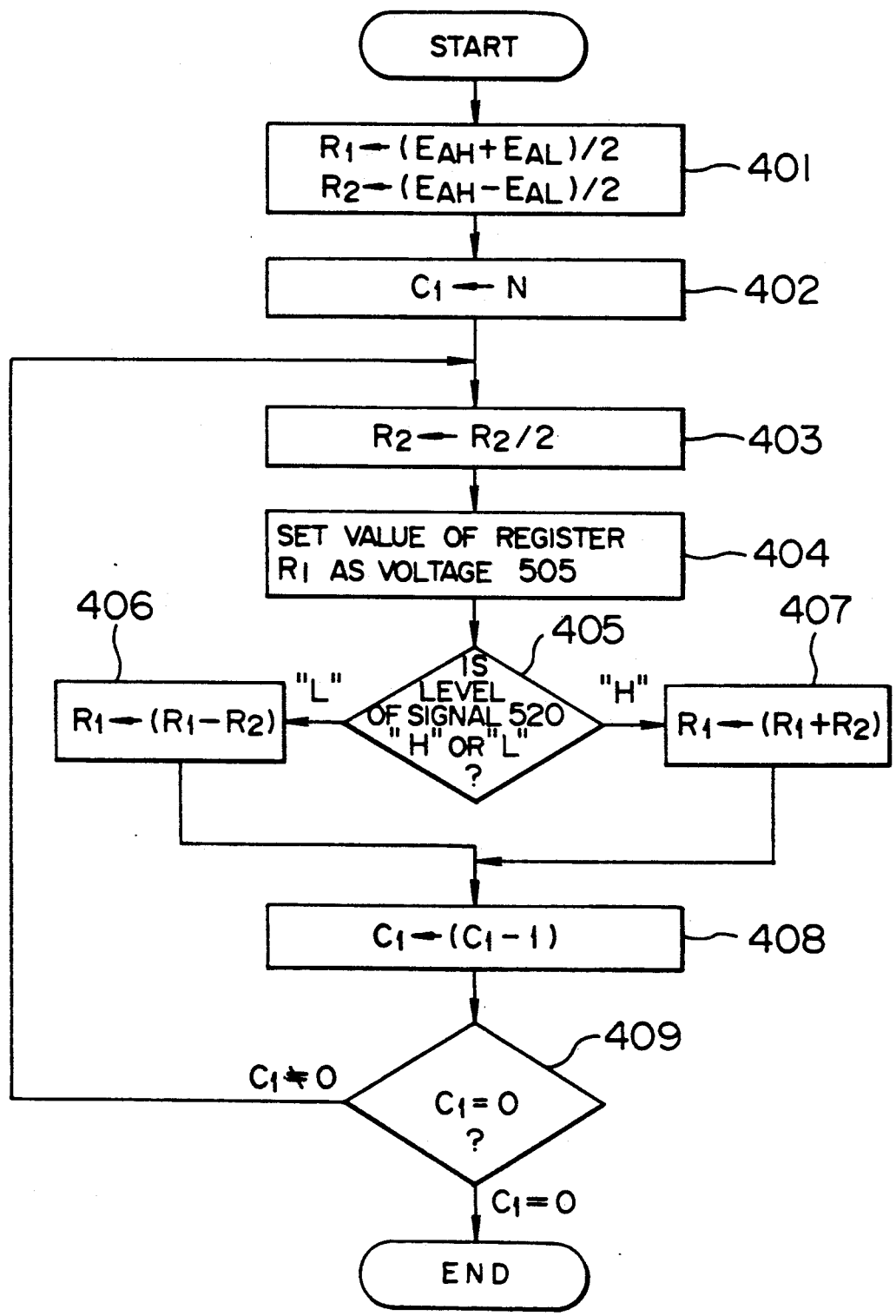
FIG. 9 is a flow chart which is helpful to explain the fourth embodiment of the present invention and shows the control operation of an operational processing circuit shown in FIG. 8.

Like the fourth embodiment shown in FIG. 8, FIG. 9 is a flow chart showing an algorithm for detecting an accurate position of the linear motor 3 after movement thereof. The control operation of the operative processing circuit 40 will now be explained by virtue of FIG. 10.

First, $E_{AL}$ is set to a register R (step 410). Next, a voltage having the value of R is outputted or set as the position control voltage 505 (step 411). In step 412, whether the output signal 520 of the comparing circuit 702 takes the low (L) level or the high (H) level is judged. If the signal 520 takes the L level, the processing is terminated. On the other hand, if the signal 520 takes the H level, the processing proceeds to step 413. In step 413, $\Delta E$ satisfying a relation of $\Delta E << (E_{AH} - E_{AL})$ is added to R and thereafter the process is returned to step 411 so that steps 411 and 412 are repeated.

According to the above method, there is provided an effect that the algorithm of processing by the operative processing circuit 40 can be simplified.

What is claimed is:

1. An optical recording and reproducing system used in combination with a disk which has concentrically-circular tracks or a spiral track thereon and in which predetermined information is recorded, said optical recording and reproducing system comprising:
   a moving part including an optical head for forming a light spot onto the track of said disk to optically record or reproduce information therein or therefrom and a moving mechanism for moving said optical head in the direction of radius of the track of said disk;
   signal detecting means for reproducing the information recorded in the track of said disk by virtue of said optical head and outputting a reproduced signal;
   operational processing means for outputting a signal for application of a positive acceleration to said moving part in order to move said moving part to the position of a desired track, reading the reproduced signal outputted from said signal detecting means to judge the arrival of said moving part to a position corresponding to 1/n (n: a positive real number larger than 1) of a distance to said desired track by the positive acceleration, outputting a signal for application of a negative acceleration to said moving part on the basis of the result of judgement, reading the reproduced signal outputted from said signal detecting means to judge the arrival of said moving part to the position of said desired track by the negative acceleration, and outputting a signal for stop of said moving part on the basis of the result of judgement; and
   digital-to-analog converting means for converting an output signal of said operational processing means into an analog signal to supply the analog signal to said moving part.

2. An optical recording and reproducing system according to claim 1, wherein a plurality of pits are formed in the track of said disk at constant intervals and said signal detecting means includes movement detecting means for reading signals reproduced from said plurality of pits to produce a signal indicative of the movement of said moving part each time said moving part moves over a predetermined number of tracks with the movement of said moving part.

3. An optical recording and reproducing system according to claim 2, wherein said movement detecting means includes means for generating a modulo m (m: positive integer) signal which indicates said optical head moves over m tracks on said disk and means for generating a cross track signal which indicates said optical head moves over one track on said disk, and said operational processing means includes a first counter for counting said modulo m signal, a xm multiplying circuit for multiplying an output signal of said first counter by m, a second counter for counting said cross track signal, a velocity detecting circuit for detecting the velocity of movement of said optical head on the basis of an interval of said modulo m signal, a switch for selectively passing therethrough either one of an output signal of said first counter and an output signal of said second counter on the basis of an output signal of said velocity detecting circuit, and an acceleration outputting circuit for controlling the operation of said moving mechanism in response to the signal passed through said switch.

4. An optical recording and reproducing system according to claim 3, wherein at least one address is recorded in a track of said disk, said signal detecting means includes address detecting means for producing from the track an address signal representative of the address of that track and timing generating means for producing a timing signal representative of a timing for rewrite of address, and said operational processing means includes a movement distance operating circuit for determining the number of tracks passed by said optical head on the basis of said address signal and said timing signal, a ÷m dividing circuit for dividing an output signal of said movement distance operating circuit by m, said first counter into which an output signal of said ÷m dividing circuit is written so that the count value of said first counter is corrected, and said second counter into which an output signal of said movement distance operating circuit is written so that the count value of said second counter is corrected.

5. An optical recording and reproducing system according to claim 2, wherein said operational processing means outputs a signal for changing at least one of the magnitude and polarity of the acceleration in a period of time when the positive or negative acceleration is applied to said moving part.

6. An optical recording and reproducing system according to claim 2, wherein said operational processing means outputs a signal for moving said moving part at a constant velocity.

7. An optical recording and reproducing system used in combination with a disk having concentrically-circular tracks or a spiral track, comprising a moving part, position detecting means, operational processing means, digital-to-analog converting means and differential amplifier means,
   said moving part including an optical head for forming a light spot onto the track of said disk to optically record or reproduce information therein or therefrom and a moving mechanism for moving said optical head in the direction of radius of the track of said disk;

said position detecting means including a position detector disposed outside of said moving part in the direction of radius of the track for detecting a position of said moving part to output a position detection signal and a position detecting circuit for amplifying the position detection signal supplied from said position detector;

said operational, processing means performing an operation for moving said moving part to a desired position;

said digital-to-analog converting means converting an output signal of said operational processing means into an analog signal;

said differential amplifier means performing subtraction of an output signal of said digital-to-analog converting means and an output signal of said position detecting means from each other; and said optical recording and reproducing system further comprising switching means interposed between said differential amplifier means and said moving part for passing or cutting off an output signal of said differential amplifier means on the basis of an output signal of said operational processing means, and comparing means for voltage-converting the output signal of said differential amplifier means through comparison thereof with a preset reference signal and supplying the voltage-converted signal to said operational processing means.

8. An optical recording and reproducing system according to claim 7, wherein said operational processing means brings said switching means into a cut-off condition, increases or decreases the level of its own output signal, detects a point of time when the polarity of an output signal of said comparing means is inverted on the basis of the increase or decrease of the output signal of said operational processing means, and brings said switching means into a conducting condition while holding the value of the output signal of said operational processing means at the point of time of detection of the polarity inversion for a predetermined period of time.

9. An optical recording and reproducing system according to claim 7, wherein said operational processing means brings said switching means into a cut-off condition, outputs its own output signal the level of which is set to a center value in a range of values which said position detection signal can take, detects a relation in magnitude between said position detection signal and the output signal of said operational processing means on the basis of an output signal of said comparing means, limits a range of values of said position detection signal on the basis of the result of detection, and repeats the limiting processing to bring said switching means into a conducting condition while outputting its own output signal the level of which is equal to said position detection signal.

* * * * *